United States Patent [19]

Kurgan et al.

[11] Patent Number: 5,519,777
[45] Date of Patent: May 21, 1996

[54] TELEPHONE SUPPORT RECEPTACLE WITH INTEGRALLY FORMED SPRING

[75] Inventors: Jeffrey F. Kurgan, Hoffman Estates; Paul J. Kudrna, Streamwood; Frank Annerino, Lombard, all of Ill.

[73] Assignee: Motorola, Inc., Schaumburg, Ill.

[21] Appl. No.: 348,783

[22] Filed: Dec. 2, 1994

Related U.S. Application Data

[63] Continuation of Ser. No. 23,996, Mar. 1, 1993, abandoned.

[51] Int. Cl.[6] ................................................ H04M 1/00
[52] U.S. Cl. ............................ 379/446; 379/426; 379/455
[58] Field of Search ................................... 379/446, 449, 379/426, 455, 454, 428; 248/316.4, 316.1; 74/110

[56] References Cited

U.S. PATENT DOCUMENTS

| | | | |
|---|---|---|---|
| 4,718,845 | 1/1988 | Sheffield et al. | 74/110 |
| 5,072,909 | 12/1991 | Huang | 248/316.4 |
| 5,113,436 | 5/1992 | Jarvela et al. | 379/455 |
| 5,121,863 | 6/1992 | Kotitalo et al. | 379/455 |
| 5,189,698 | 2/1993 | Hakanen | 379/455 |
| 5,305,381 | 4/1994 | Wang et al. | 379/455 |

FOREIGN PATENT DOCUMENTS 5-37619  2/1993  Japan ................................. 379/428

*Primary Examiner*—Jeffery Hofsass
*Assistant Examiner*—Jack Chiang
*Attorney, Agent, or Firm*—Daniel W. Juffernbruch

[57] ABSTRACT

A telephonic support receptacle for releasably affixing a portion of a telephonic handset thereto. Latch members forming portions of the support receptacle latchingly engage with latching surfaces formed upon the telephonic handset. Cantilevers are formed along opposing side surfaces of the support receptacle. Application of actuation forces upon either cantilever causes movement of the latch members out of the latching positions thereby to release the telephonic handset from latching engagement with the support receptacle.

17 Claims, 5 Drawing Sheets

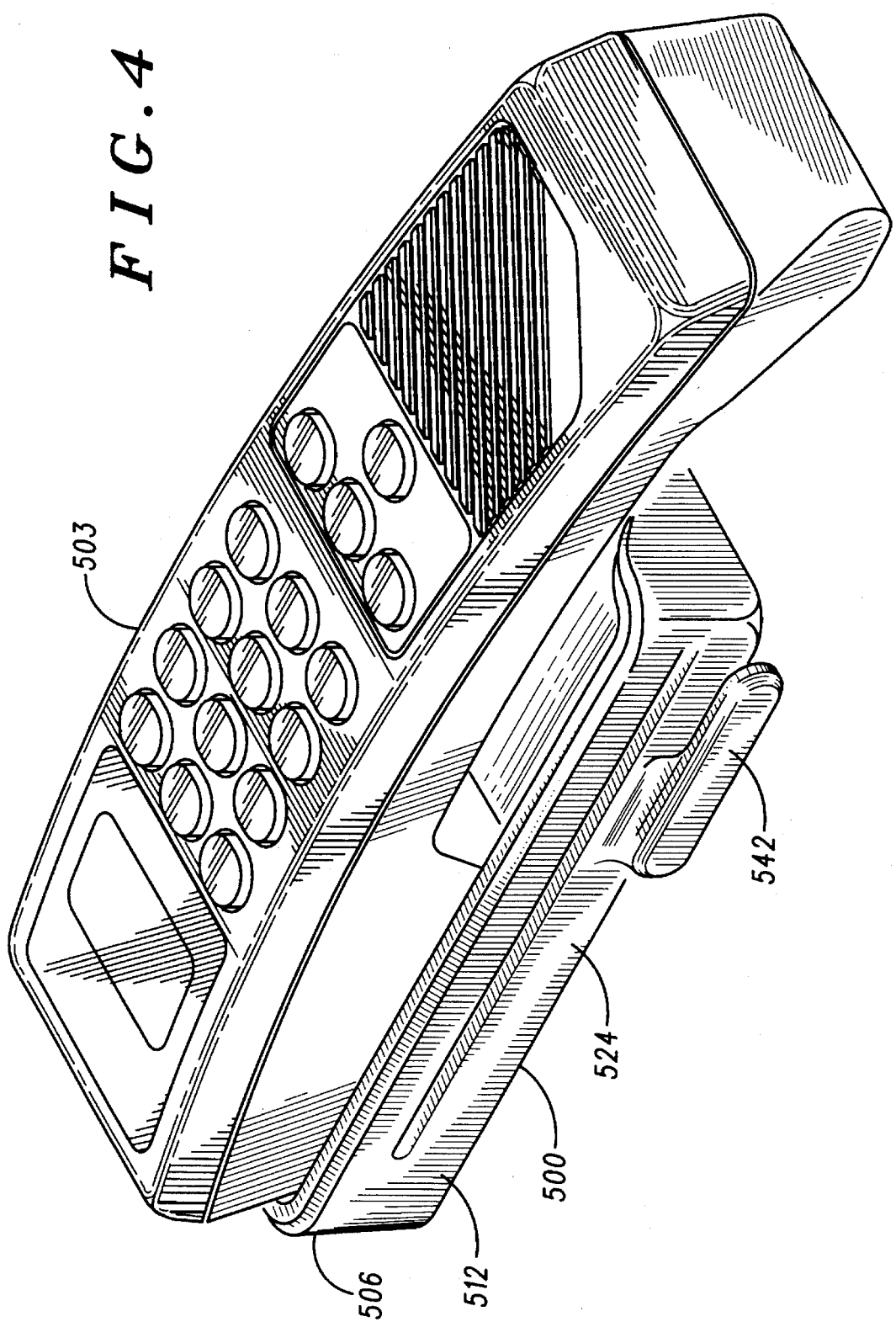

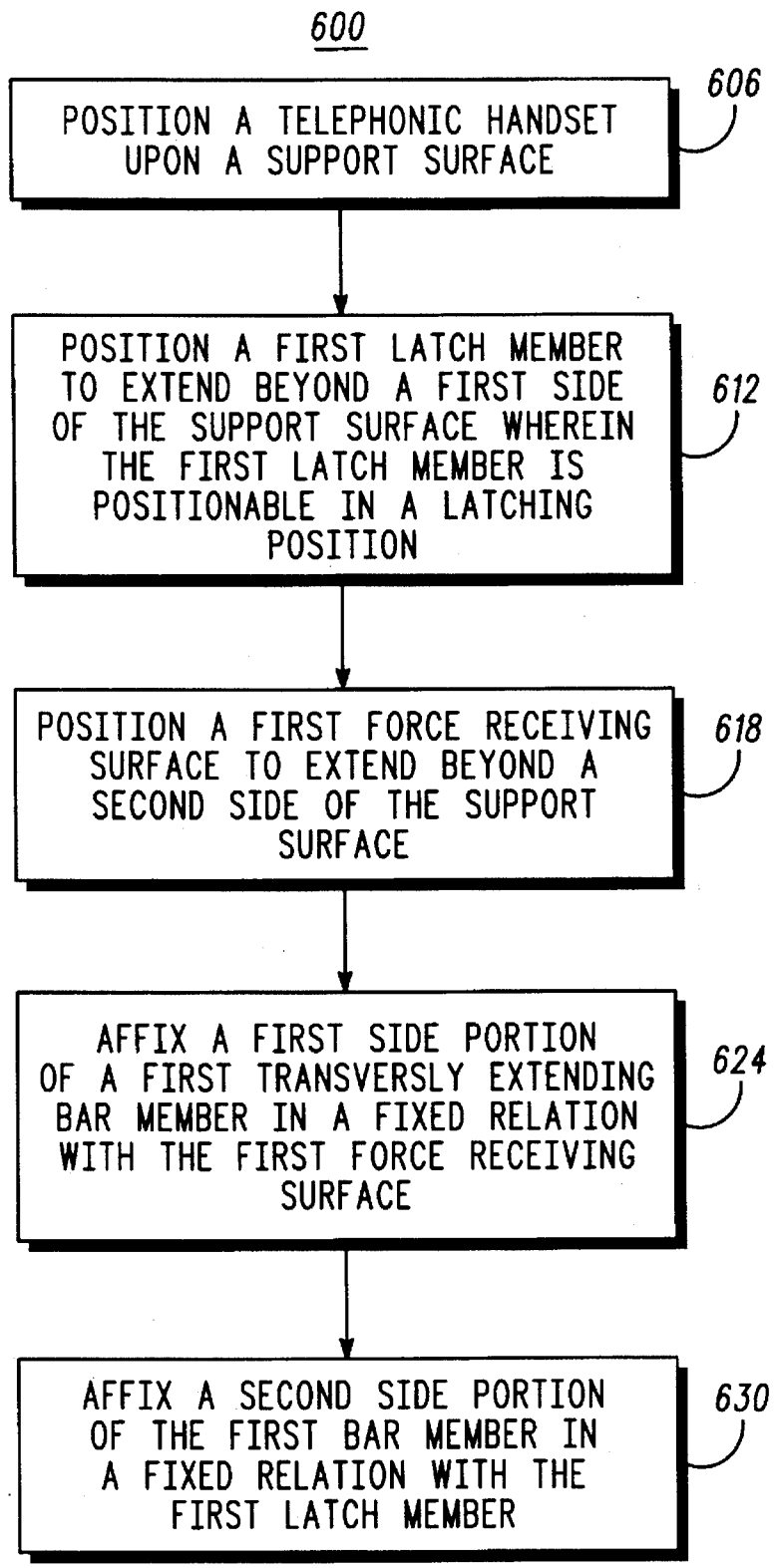

TELEPHONE SUPPORT RECEPTACLE WITH INTEGRALLY FORMED SPRING

This is a continuation of application Ser. No. 08/023,996, filed Mar. 1, 1993 and now abandoned.

BACKGROUND OF THE INVENTION

The present invention relates generally to telephonic support structures and, more particularly, to a support receptacle, and an associated method, for supporting a telephonic handset, such as the handset of a portable radiotelephone.

A communication system is comprised, at a minimum, of a transmitter and a receiver interconnected by a communication channel. The transmitter of the communication system is operative to convert a signal to be transmitted upon the communication channel into a form permitting transmission thereupon.

A radio communication system is a communication system as above-described but wherein the transmission channel is formed of a radio frequency channel defined by a range of frequencies of the electromagnetic frequency spectrum. A transmitter operative in a radio communication system converts a communication signal to be transmitted into a form suitable for transmission thereof upon the radio frequency channel.

Conversion of the communication signal into the form which permits transmission of the communication signal upon the radio frequency channel is effectuated by a process referred to as modulation. In a modulation process, the communication signal is impressed upon an electromagnetic wave. The electromagnetic wave is commonly referred to as a "carrier signal." The carrier signal is characterized by an oscillating frequency which is commonly referred to as the "carrier frequency." The resultant signal, formed of the combination of the communication signal and the carrier signal is referred to as a modulated carrier signal or, more simply, a modulated signal. The transmitter includes circuitry operative to perform such a modulation process.

Because the modulated signal may be transmitted through free space over large distances, radio communication systems are widely utilized to effectuate communication between a transmitter and a remotely-positioned receiver.

The receiver of the radio communication system which receives the modulated carrier signal contains circuitry analogous to, but operative in a manner reverse with that of the circuitry of the transmitter and is operative to perform a process referred to as demodulation.

A two-way radio communication system is a radio communication system, similar to the radio communication system above-described, but which permits both transmission of a modulated signal from a location and reception at such location of a modulated signal. Each location of such a two-way communication system contains both a transmitter and a receiver. The transmitter and the receiver positioned together at the single location typically comprise a unit referred to as a radio transceiver or, more simply, a transceiver.

A cellular communication system is one type of two-way radio communication system, and, when operative, communication is permitted with a radio transceiver positioned at any location within a geographic area encompassed by the cellular communication system.

A cellular communication system is created by positioning a plurality of fixed-site radio transceivers, referred to as base stations, at spaced-apart locations throughout a geographic area. The base stations are connected to a conventional, wireline, telephonic network. Associated with each base station of the plurality of base stations is a portion of a geographic area encompassed by the cellular communication system. Such portions are referred to as cells. Each of the plurality of cells is defined by one of the base stations of the plurality of base stations, and the plurality of cells together define the coverage area of the cellular communication system.

A radio transceiver, referred to in a cellular communication system as a cellular radiotelephone or, more simply, a cellular phone, positioned at any location within the coverage area of the cellular communication system, is able to communicate with a user of the conventional, wireline, telephonic network by way of a base station. Modulated signals generated by the radiotelephone are transmitted to a base station, and modulated signals generated by the base station are transmitted to the radiotelephone, thereby to effectuate two-way communication therebetween. (A signal received by a base station is then transmitted to a desired location of a conventional, wireline network by conventional telephony techniques. And, signals generated at a location of the wireline network are transmitted to a base station by conventional telephony techniques, thereafter to be transmitted to the radiotelephone by the base station.)

Operation of a cellular phone is permitted, for instance, in a vehicle traveling within the geographic area encompassed by the cellular communication system. As the vehicle travels through successive cells of the plurality of cells comprising the cellular communication system, signals transmitted by the cellular phone are received by successive base stations, each associated with the successive cells. Successive base stations of the successive cells similarly transmit signals to the cellular phone.

A cellular phone typically includes a telephonic handset similar in configuration with telephonic handsets of conventional, telephonic apparatus. In some constructions of cellular phones, the entire transceiver circuitry of the cellular phone is contained in the handset. Such construction of cellular phones is referred to as a portable, cellular phone. In other constructions of cellular phones, at least portions of the transceiver circuitry of the cellular phone are housed in structure located beyond the telephonic handset, but connected thereto by way of a connecting cable.

When a cellular phone, either the aforementioned portable cellular phone or a cellular phone of other conventional construction, is positioned within a vehicle and operated thereat, the operator of such phone is, in many instances, the driver of the vehicle. The cellular phone must be of a design to permit the user to perform normal driving functions while simultaneously operating the radiotelephone to communicate therethrough.

Also, additional apparatus is oftentimes utilized to support the radiotelephone handset when the telephonic handset is not being utilized by the operator of the cellular phone. Such support apparatus must be of a design to permit positioning thereof so as to permit the operator of the cellular phone convenient access to the telephonic handset when the operator desires to use the cellular phone and also to reposition the handset upon the support apparatus when the handset is no longer utilized.

The support apparatus, sometimes referred to as a support receptacle or a telephonic hang-up cup, may be mounted, for example, upon the dashboard of a vehicle, upon an armrest portion of the vehicle, or within the glove compartment of the vehicle. At any of these mounting locations, the support receptacle may be mounted in position by means of threaded shaft members affixing the receptacle directly to the respective mounting location. The support receptacle may also be affixed to a mounting assembly which, in turn, is affixed to the respective mounting location. Alternately, the support receptacle may be mounted at the mounting location by positioning a two-sided adhesive tape at the mounting location thereby to permit affixation of the telephonic support receptacle at the mounting location.

Several existing designs of support receptacles which may be mounted at the just-mentioned mounting locations of the vehicle are comprised of housings containing face surfaces having recessed areas of dimensions permitting the positioning of a portion of a handset thereat. Latch members formed integral with the support receptacle and projecting from sidewalls defining the recessed area latchingly engage with corresponding, mating latching surfaces formed on the telephonic handsets to permit latching engagements therebetween. Typically, such support receptacle designs include latch members formed to project beyond two opposing sidewalls of the sidewalls defining the recessed areas. To remove the telephonic handsets from the support receptacles, forces are exerted upon the handsets to pull the handsets away from the support receptacles. In order to reposition the handsets at such support receptacles, a reverse procedure is utilized. Exertion of such forces, however, are transmitted to the support receptacles. Particularly in instances in which the support receptacles are affixed to the mounting locations of the vehicle by the two-sided adhesive tape, forces transmitted to the support receptacles may be great enough to pull the entire receptacles away from the mounting locations of the vehicles at which the support receptacles are mounted.

To reduce the magnitudes of the forces required to remove a handset from a support receptacle, several other existing support receptacle designs utilize latch members which are retractable. Such retractable latch members may be positioned either in or out of a latching position. Button-type actuators are interconnected with the retractable latch members such that forces applied to the actuators cause retraction of the retractable latch members out of the latching position. When the latch members are positioned in the retracted position, magnitudes of forces required to remove handsets from the support receptacles are reduced.

The button-type actuators which receive the actuation forces to position the latch members out of the latching positions should be positioned at opposing sides of the support receptacles, and actuation of either of the actuators should cause retraction of the latch members out of the latching positions.

Because existing support receptacles having retractable latch members include a relatively large number of parts which must be assembled theretogether, a relatively lengthy assembly procedure is required.

As any reduction in the number of parts required to be assembled theretogether to form the support receptacle would reduce the assembly time required to assemble the support receptacle, such reduction would facilitate ease of assembly and also reduce assembly costs of the support receptacle.

SUMMARY OF THE INVENTION

The present invention advantageously provides a support receptacle of simplified design for supporting a telephonic handset therefrom.

The present invention further advantageously provides a radio transceiver assembly including a transceiver handset and a support receptacle for releasably supporting the transceiver handset therefrom.

The present invention yet further advantageously provides a method for releasably supporting a telephonic handset.

The present invention includes yet further advantages and features, the details of which will be better understood by reading the detailed description of the preferred embodiments hereinbelow.

In accordance with the present invention, therefore, a support receptacle for releasably supporting a telephonic handset, and an associated method, is disclosed. A support surface receives at least a portion of the telephonic handset thereupon. A first retaining member is formed to extend beyond a first side of the support surface. The first retaining member is positionable in a retaining position for engaging the telephonic handset when the at least portion of the telephonic handset is positioned at the support surface, thereby to retain the telephonic handset in position thereat. A first force receiving surface is formed to extend beyond a second side of the support surface. The first force receiving surface receives an actuation force and flexes responsive to the actuation force. A first transversely-extending member is affixed at a first side portion thereof in a fixed relation with the first force receiving surface. The member is affixed at a second side portion thereof in a fixed relation with the first retaining member. Thereby, flexing movement of the first force receiving surface responsive to application of the actuation force thereto causes translation of the transversely-extending member and, in turn, flexing of the first retaining member out of the retaining position to permit thereby release of the telephonic handset out of the supportive positioning thereof at the support surface.

BRIEF DESCRIPTION OF THE DRAWINGS

The present invention will be better understood when read in light of the accompanying drawings in which:

FIG. 4 is a perspective view of a transceiver assembly of a preferred embodiment of the present invention having a telephonic handset removably affixed to the telephonic support receptacle of the preceding figures; and FIG. 5 is a logical flow diagram listing the method steps of a preferred embodiment of the present invention.

DESCRIPTION OF THE PREFERRED EMBODIMENTS

Figure 1:
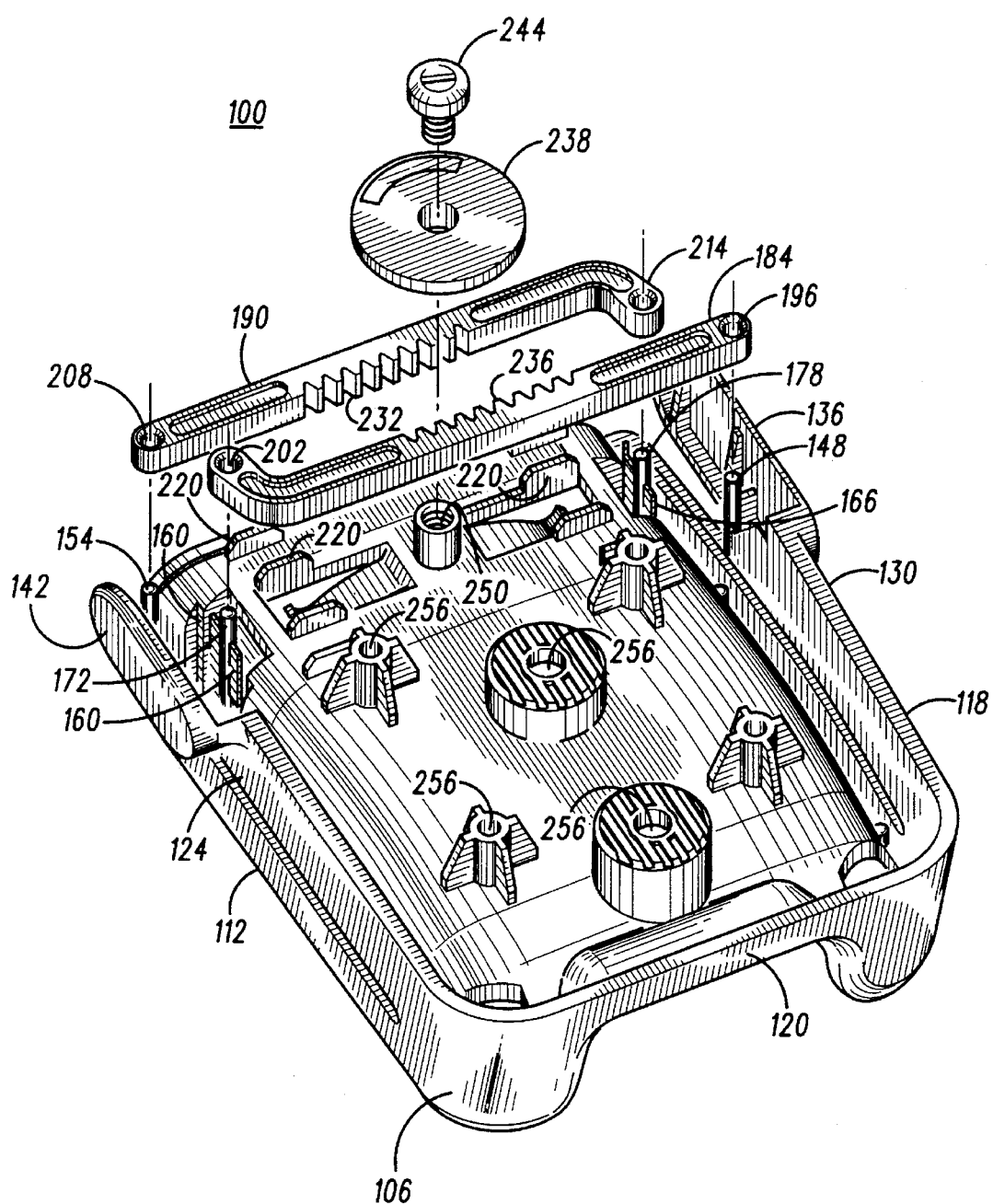
FIG. 1 is an exploded view of the telephonic support receptacle of a preferred embodiment of the present invention.

Referring first to FIG. 1, the telephonic support receptacle, referred to generally by reference numeral 100, of a preferred embodiment of the present invention is shown in exploded form. The exploded view of the figure is taken from beneath the support receptacle. Support receptacle 100 comprises supportive well 106 having a support surface formed upon a top surface of the supportive well. (The top surface of supportive well 116 is hidden from view in the illustration of FIG. 1 taken from beneath receptacle 100.)

Receptacle 100 includes sidewall portions positioned about three perimetal side portions thereof; such sidewall portions here include first sidewall portion 112, second sidewall portion 118, and rear sidewall portion 120. First and second sidewall portions 112 and 118 each include horizontally-extending portions which form cantilevers 124 and 130, respectively.

A first force receiving surface 136 is formed along an outer face surface of cantilever 130 and a second force receiving surface 142 is formed along an outer face surface of cantilever 124. Application of an actuation force to first force receiving surface 136 causes flexing of cantilever 130. Similarly, application of an actuation force to second force receiving surface 142 causes flexing movement of cantilever 124.

Projecting post member 148 is affixed to cantilever 130 at a top end thereof and extends along a longitudinal axis thereof beneath the body of supportive well 106. Similarly, projecting post member 154 is affixed at a top end thereof to cantilever 124 and extends along a longitudinal axis thereof beneath the body of supportive well 106. Because projecting post members 148 and 154 are affixed to cantilevers 130 and 124, respectively, flexing movement of the respective cantilevers responsive to application of actuation forces to the respective force receiving surfaces 136 and 142 cause corresponding translation of the post members 148 and 154 affixed to the respective cantilevers.

While cantilevers 124 and 130 are capable of flexing movement upon application of actuation forces upon force receiving surfaces 142 and 136, respectively, such flexing occurs only during application of the actuation forces upon the respective force receiving surfaces. In the absence of actuation forces applied to surfaces 142 and 136, or upon termination of application of the actuation forces, no bending moments are applied to the cantilevers to cause the flexing movements thereof, and the cantilevers are positioned or return to the positions illustrated in the figure. As post members 148 and 154 are affixed to cantilevers 130 and 124, respectively, in the absence of actuation forces applied to surfaces 142 or 136, or upon termination of application of the actuation forces, post members 148 and 154 are also positioned or return to the positions illustrated in the figure.

Support receptacle 100 further includes downwardly-extending cantilever 160 which is also formed to extend beneath first sidewall portion of supportive well 106. And, similarly, downwardly-extending cantilever 166 is also formed to extend beneath second sidewall portion of supportive well 106. Formed upon inner face surfaces of both downwardly-extending cantilevers 160 and 166 (and hidden from view in the view illustrated in the figure) are first and second latch members.

Downwardly-projecting post member 172 is affixed to cantilever 160 and extends therebeneath. Similarly, downwardly-projecting post member 178 is affixed to cantilever 166 and extends therebeneath.

Application of bending moments upon cantilevers 160 and 166 (such as by exerting forces upon post members 172 and 178 which extend from cantilevers 160 and 166 and which are affixed thereto), cause flexing movement of the respective cantilevers 160 and 166. In the absence of forces causing such bending moments upon cantilevers 160 and 166, or upon termination of application of such forces causing bending moments, cantilevers 160 and 166 are positioned or return to the positions illustrated in the figure.

Telephonic support receptacle 100 further comprises first and second transversely-extending bar members 154 and 190. Transversely-extending bar members 184 and 190 are of lengths substantially corresponding to widthwise dimensions of supportive well 106. First and second thru-holes 196 and 202 are formed through first transversely-extending bar member 184 at first and second side portions thereof, respectively. Similarly, first and second receiving thru-holes 208 and 214 are formed to extend through second transversely-extending bar member 190, also at first and second side portions thereof, respectively.

First receiving thru-hole 196 of bar member 184 is of dimensions and is positioned along the first side portion of bar member 184 to permit insertion of projecting post member 148 therethrough. And, second receiving thru-hole 202 of bar member 184 is of dimensions and is positioned along the second side portion of bar member 184 to permit insertion of post member 172 therethrough. First transversely-extending bar member 184 is thereby operative to interconnect horizontally-extending cantilever 130 and downwardly-extending cantilever 160.

Bar member 184 is a rigid member; therefore, flexing movement of cantilever 130 responsive to bending moments applied thereto as a result of actuation forces applied to force receiving surface 136 causes translation of bar member 184 (due to translation of post member 172). Such translation of bar member 184 causes bending moments to be applied to cantilever 160, thereby to cause flexing movement of cantilever 160.

First receiving thru-hole 208 of second transversely-extending bar member 190 is of dimensions and is positioned along the first side portion of bar member 190 to permit insertion of projecting post member 154 therethrough. And, second receiving thru-hole 214 is of dimensions and is positioned along the second side portion of bar member 190 to permit insertion of post member 178 therethrough. Second transversely-extending bar member 190 is thereby operative to interconnect horizontally-extending cantilever 124 and downwardly-extending cantilever 166. Bar member 190 is a rigid member; therefore, flexing movement of cantilever 124 responsive to bending moments applied thereto as a result of actuation forces applied to force receiving surface 142 causes translation of bar member 190 (due to translation of pest member 178). Such translation of bar member 190 causes bending moments to be applied to cantilever 166, thereby to cause flexing movement of cantilever 166.

Second side portions of both first and second transversely-extending bar members 184 and 190 include hooked-end portions forming L-shaped configurations. Such hook-shaped end portions permit pest members 148 and 178 to be offset from one another, and also to permit post members 154 and 172 to be offset from one another. Such offsetting relationships between the respective pest members 148 and 178 and 154 and 172 permit cantilevers 160 and 166 to be aligned with one another at opposing sides of supportive well 106.

Spaced-apart and transversely-extending guides 220 are also formed along a bottom face surface of supportive well 106. Guides 220 form spaced-apart guideways to assist in maintaining the first and second transversely-extending bar members 184 and 190 in position during translation of the respective bar members.

First rack gear 226 comprised of a plurality of gear teeth is formed along an inner face surface of first transversely-extending bar member 154. Similarly, second rack gear, also comprised of a plurality of gear teeth, is formed to extend along an inner face surface of second transversely-extending bar member 190.

A pinion gear, comprised of spur gear 238 is also comprised of a plurality of gear teeth (such gear teeth are hidden from view in the illustration of the figure). The gear teeth of spur gear 238 meshingly engage with corresponding gear teeth of both first rack gear 226 and second rack gear 232 of first and second bar members 184 and 190, respectively. Because of such meshing engagement, translation of either bar member 184 or 190 (and corresponding translation of rack gear 226 or 232, respectively) causes rotation of spur gear 238 and, in turn, translation of the other of the bar members 184 or 190.

Hence, application of an actuation force upon first force receiving surface 136 causes flexing movement of not only cantilever 160 (as a result of translation of bar member 184) but also flexing movement of cantilever 166 (due to translation of bar member 190 resulting from the driving engagement between spur gear 238, and rack gear 232). And, application of an actuation force upon second force receiving surface 142 causes flexing movement of not only cantilever 166 (as a result of translation of bar member 190) but also flexing movement of cantilever 160 (due to translation of bar member 184 resulting from the driving engagement between spur gear 238 8rid rack gear 226). Accordingly, application of an actuation force to either first or second force receiving surface 136 or 142 results in flexing movement of beth cantilevers 160, and 166. As latch members (which, as noted hereinabove, are hidden from view in the illustration of the figure) are formed upon inner face surfaces of cantilevers 160 and 166, positioning of such latch members may be altered by application of actuation forces upon either first or second force receiving surfaces 136 or 142.

Threaded shaft member 244 is further illustrated in the figure. Shaft member 242 threadingly engages with threaded opening 250, upon insertion through an aperture extending through spur gear 238. Shaft member 242 is operative to affix spur gear 238 to supportive well 106. Openings 256 extending through supportive well 106 are further shown in the figure. Such openings permit threaded shaft members (not shown in the figure) or other affixing apparatus to extend therethrough to affix thereby supportive well 106 to a mounting location, such as a mounting location positioned in a vehicle.

Figure 2:
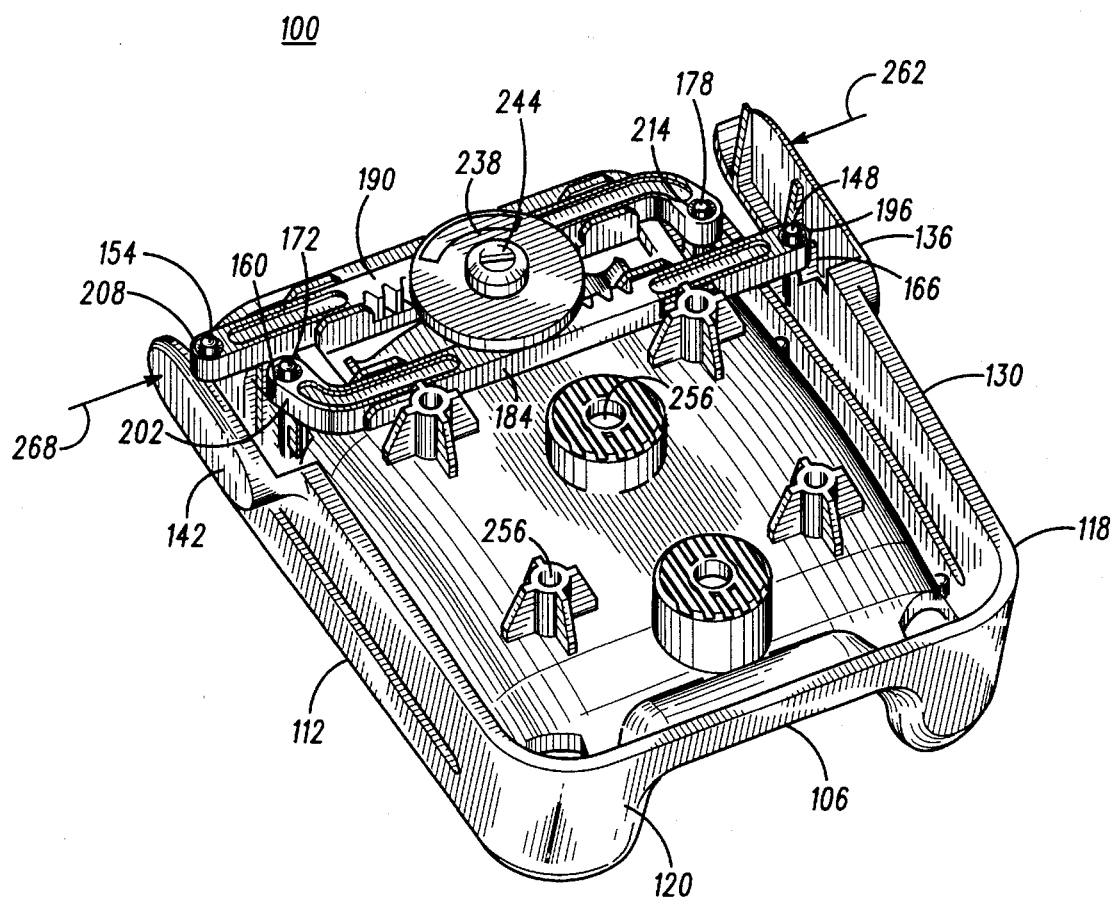
FIG. 2 is a perspective view of the telephonic support receptacle shown in FIG. 1, once assembled, taken from beneath the support receptacle.

Turning next to FIG. 2, a perspective view of telephonic support receptacle 100, taken from beneath the receptacle, is shown. In the view of FIG. 2, the first and second transversely-extending bar members 184 and 190 are affixed in position to extend between the opposing sides of supportive well 106. Downwardly-projecting post member 148 is inserted to extend through first receiving thru-hole 196 formed at the first side portion of bar member 184. And, downwardly-projecting post member 172 is positioned to extend through second receiving thru-hole 202 formed at the second side portion of bar member 184. Analogously, downwardly-projecting post member 154 is inserted to extend through first receiving thru-hole 208 formed at the first side portion of second transversely-extending bar member 190. And, downwardly-projecting post member 178 is inserted to extend through second receiving thru-hole 214 formed at the second side portion of second bar member 190.

Spur gear 238 is positioned such that the gear teeth thereof meshingly engage with corresponding gear teeth of rack gears 226 and 232 of the first and second transversely-extending bar members 184 and 190, respectively.

Application of an actuation force upon first force receiving surface 136 in a direction indicated by arrow 262 in the figure causes a bending moment to be exerted upon cantilever 130. Exertion of such bending moment causes flexing movement of the cantilever and translation of post member 148. Translation of post member 148 causes translation of bar member 184 which, in turn, applies a bending moment upon cantilever 160. Such bending moment applied upon cantilever 160 causes flexing movement of the cantilever.

Because of the meshing engagement between the gear teeth of spur gear 238 and the gear teeth of first and second rack gears 226 and 232, translation of second bar member 190 is also caused. (It should be noted that the direction of translation of bar member 190 is in a direction reverse with that of the direction of translation of bar member 184.) Such translation of bar member 190 causes bending moments to be applied upon cantilever 166 and, thereby, flexing movement of the cantilever.

Analogously, application of an actuation force upon force receiving surface 142 in a direction indicated by arrow 268 causes bending moments to be exerted upon cantilever 124. Such bending moments causes flexing movement of the cantilever and translation of post member 178. Translation of post member 178 causes, in turn, translation of bar member 190. Translation of bar member 190 causes exertion of bending moments upon cantilever 166. Such bending moments exerted upon the cantilever causes flexing movement thereof.

Again, because of the meshing engagement between the gear teeth of spur gear 238 and corresponding gear teeth of first and second rack gears 226 and 232, translation of bar member 194 also causes translation of bar member 184. (It is again noted that the direction of translation of bar member 184 is in a direction reverse with that of the direction of translation of bar member 190.) Such translation of bar member 184 causes bending moments to be exerted upon cantilever 160. Such bending moments exerted upon cantilever 160 causes flexing movement of the cantilever.

Hence, application of actuation forces upon either first force receiving surface 136 or second force receiving surface 142 (or beth first and second force receiving surfaces 136 and 142) causes flexing movement of beth cantilevers 160 and 166. As latch members (hidden from view in the illustration of FIG. 2) are formed upon inner face surfaces of cantilevers 160 and 166, flexing movement of cantilevers 160 and 166 causes corresponding movement of such latch members.

Figure 3:
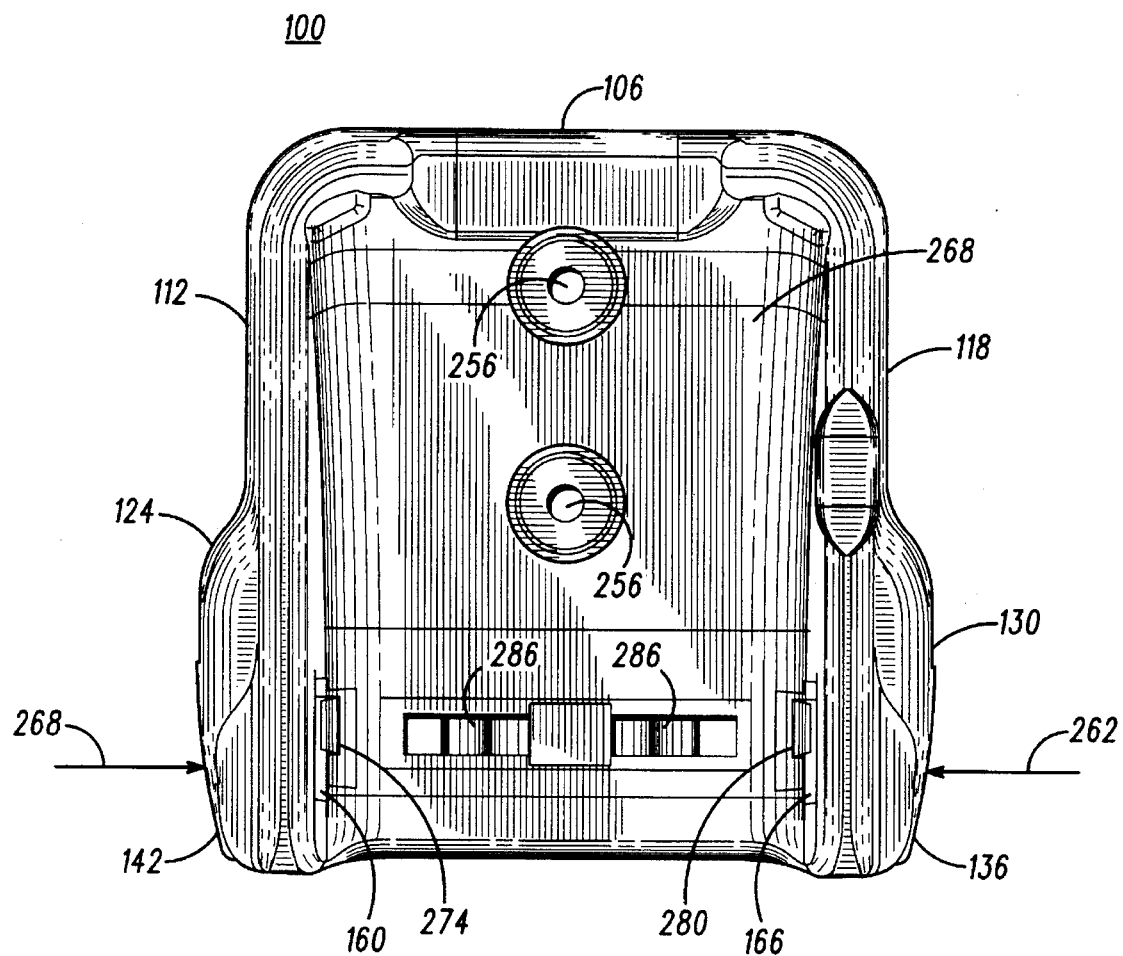
FIG. 3 is a perspective view taken from above the telephonic support receptacle of the preceding figures.

Turning next to FIG. 3, telephonic support receptacle 100 is again shown in perspective, here from above a top surface of supportive well 106. In the view of FIG. 3, support surface 268 formed of a top face surface of supportive well 106 is shown. First and second force receiving surfaces 136 and 142 are again shown at opposing sides of supportive well 106. And, end portions of cantilevers 160 and 166 are also shown. In the top, perspective view of FIG. 3, latch member 274 formed upon an inner face surface of latch member 160, and latch member 280 formed upon an inner face surface of cantilever 166 are further shown. Latch members 274 and 280 are shown in latching positions whereat latch members 274 and 280 latchingly engage with latch surfaces formed upon a transceiver handset when the transceiver handset is positioned at support surface 268 to be supported thereat.

As latch members 274 and 280 are affixed to face surfaces of cantilevers 160 and 166, respectively, flexing movement of such cantilevers causes corresponding movement of the latch members 274 and 280. When a transceiver handset is first positioned upon support surface 268, forces are exerted by the transceiver handset housing upon the inner face surfaces of cantilevers 160 and 166 (and latch members 274 and 280 formed thereupon). Such forces form bending moments to cause flexing movement of cantilevers 160 and 168 until latch members 274 and 280 become aligned with corresponding latching surfaces formed upon the transceiver handset housing. When the latch members and corresponding latching surfaces align with one another, forces are no longer exerted by the transceiver handset housing upon the inner face surfaces of cantilevers 160 and 166, and cantilevers 160 and 166 spring back into unstressed positions, namely, the latching positions illustrated in the view of FIG. 3. In such positions, latch members 274 and 280 formed upon the inner face surfaces of cantilevers 160 and 166 latchingly engage with the corresponding latching surfaces formed upon the transceiver handset housing. Latch members 274 and 280 thereby maintain the transceiver handset in a supportive position upon support surface 268.

Arrows 262 and 268 are again shown in the view of FIG. 3. Arrows 262 and 268 are indicative of actuation forces which may be applied to force receiving surfaces 136 and 142. As described more fully with respect to the preceding figures, application of actuation forces to either, or beth, of the force receiving surfaces 136 and 142 causes flexing movement of both cantilevers 160 and 166 to rotate latch members 274 and 280 out of the latching position. When translated out of the latching position, the transceiver handset is no longer latchingly affixed to support receptacle 100 and the transceiver housing may be removed therefrom. Springs 286 formed upon support surface 268 are further shown in the figure. Such spring members are operative to provide a spring force to assist in the release of the transceiver handset from support receptacle 100 when latch members 274 and 280 are translated out of the latching position.

Turning next to the perspective view of FIG. 4, a transceiver assembly, referred to generally by reference numeral 490, is shown. Transceiver assembly 490 comprises telephonic support receptacle 500 which corresponds to telephonic support receptacle 100 of the preceding figures, and telephonic handset 503 supportively positioned upon receptacle 500. Support receptacle 500 includes supportive well 506 of which first sidewall portion 512 is illustrated in the figure. Horizontally-extending cantilever 524 formed of a portion of sidewall portion 512 is further illustrated in the figure. Application of an actuation force against force receiving surface 542 formed upon an outer face surface of cantilever 524 causes translation of latch members (not shown in the view of FIG. 5, but analogous to latch members 274 and 280 of receptacle 100 of FIG. 3) out of latching positions, thereby to permit release of telephonic handset 503 from support receptacle 500.

In the preferred embodiment of the present invention, cantilevers 124, 130, 160, and 166 are integrally formed with supportive well 106 of a thermoplastic material. Each of the cantilevers thereby form living hinges which are permitting of flexing movement upon application of bending moments thereto, as previously described. Because of such integral formation, no separate spring member is required to generate forces which cause bending moments or which cause translation of bar members 184 and 190. Accordingly, support receptacle 100 of the preferred embodiment utilizes only the five separate parts illustrated in FIG. 1, and such support receptacle may be quickly and efficiently assembled during an automated, assembly line-like process period.

Turning finally now to the logical flow diagram of FIG. 5, the method steps of the method, referred to generally by reference numeral 600, of a preferred embodiment of the present invention for releasably supporting a telephonic handset are listed. Method 600 includes the step of, as indicated by block 606, positioning at least a portion of the telephonic handset upon a support surface.

Then, as indicated by block 612, a first latch member is positioned to extend beyond a first side of the support surface. The first latch member is positionable in a latching position for latchingly engaging the telephonic handset when the handset is positioned at the support surface.

Next, and as indicated by block 618, a first force receiving surface is positioned to extend beyond a second side of the support surface. The first force receiving surface receives an actuation force and flexes responsive thereto.

Next, and as indicated by block 624, a first side portion of a first transversely-extending bar member is affixed in a fixed relation with the first force receiving surface.

Finally, and as indicated by block 630, a second side portion of the first transversely-extending bar member is affixed in a fixed relation with the first latch member. Thereby, flexing movement of the first force receiving surface causes translation of the transversely-extending bar member, and, in turn, flexing of the first latch member.

While the present invention has been described in connection with the preferred embodiments shown in the various figures, it is to be understood that other similar embodiments may be used and modifications and additions rosy be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. A support receptacle for releasably supporting a telephonic handset, comprising:

a support surface for accepting a portion of the telephonic handset and formed a portion of a supportive well of dimensions permitting positioning of the portion of the telephonic handset thereupon, said supportive well further comprising at least first and second sidewall portions extending beyond two opposing sides of the support surface;

a first retaining member provided at a first side of the support surface to engage the telephonic handset when the telephonic handset is positioned at the support surface, wherein said first retaining member is comprised of a first latch member positioned upon a face surface of a first-latch cantilever extending beyond the first sidewall portion of the support surface, said first latch cantilever is integrally formed with the support surface to form an integral spring to receive an actuation force;

a first force receiving surface provided at a second side of the support surface to receive the actuation force; and a first transversely-extending member operatively connected between the first force receiving surface and the first retaining member such that flexing movement of the first force receiving surface responsive to application of the actuation force causes translation of the transversely-extending member, and, in turn, flexing of the first retaining member out of the retaining position to release the telephonic handset.

2. The support receptacle of claim 1 wherein said first retaining member is formed along the first sidewall portion of the supportive well.

3. The support receptacle of claim 1 wherein said first retaining member is formed along the second sidewall portion of the supportive well.

4. The support receptacle of claim 1 wherein a side portion of said first transversely-extending member is affixed to the first-latch cantilever such that translation of the transversely-extending member causes exertion of a bending moment upon the first-latch cantilever to cause flexing movement of the first-latch cantilever and the first latch member positioned thereupon.

5. The support receptacle of claim 1 wherein said first force receiving surface is positioned upon an outer face of a first force-receiving cantilever extending beyond the second side of the support surface.

6. The support receptacle of claim 5 wherein a side portion of said first transversely-extending member is affixed to the first force-receiving cantilever such that application of the actuation force upon the force receiving surface causes flexing movement of the first force-receiving cantilever and translation of the first transversely-extending member.

7. The support receptacle of claim 1 further comprising a second retaining member provided at the second side of the support surface and comprising a second-latch member positioned upon face surface of a second-latch cantilever extending beyond the second side of the support surface to provide an integrally formed spring to engage the telephonic handset when the telephonic handset is positioned at the support surface.

8. The support receptacle of claim 7 further comprising a second force receiving surface provided at the first side of the support surface, the second force receiving surface comprising an integrally formed spring to receive an actuation force.

9. The support receptacle of claim 8 further comprising a second transversely-extending member operatively connected between the second force receiving surface and the second retaining member such that flexing movement of the second force receiving surface responsive to application of the actuation force cause translation of the second transversely-extending member, and, in turn, flexing of the first retaining member out of the retaining position to release the telephonic handset.

10. The support receptacle of claim 7 wherein a side portion of the second transversely-extending member is affixed to the second latch cantilever such that the translation of the second transversely-extending member cause exertion of a bending moment upon the second-latch cantilever to cause flexing movement of the second-latch cantilever and the second latch member positioned thereupon.

11. The support receptacle of claim 9 wherein the second force receiving surface is positioned upon an outer face surface of a second force-receiving cantilever extending beyond the first side of the support surface.

12. The support receptacle of claim 11 wherein a side portion of said second transversely-extending member is affixed to the second force-receiving cantilever such that application of the actuation force upon the second force receiving surface causes flexing movement of the second force-receiving cantilever and translation of the second transversely-extending member.

13. The support receptacle of claim 9 wherein the first and second transversely-extending members, respectively, comprise substantially identically shaped bar members, wherein said bar members are rotatingly connected to their respective first and second force receiving surface and retaining member, wherein said bar members are spaced apart from one another and which extend in parallel directions.

14. The support receptacle of claim 13 wherein a first rack gear is formed to extend along a surface of the first transversely-extending bar member and a second rack gear is formed to extend along a surface of the second transversely-extending bar member.

15. The support receptacle of claim 14 further comprising a pinion gear positioned to engage with the first rack gear and with the second rack gear such that translation of the first transversely-extending bar member exerts forces upon the pinion gear which generates driving forces upon the second rack gear to cause translation of the second transversely-extending bar member, and such that translation of the second transversely-extending bar member exerts forces upon the pinion gear which generates driving forces upon the first rack gear to cause translation of the first transversely-extending bar member.

16. The support receptacle of claim 1, wherein said first force receiving surface is integrally formed in the second side of the support surface to provide an integrally formed spring.

17. The support receptacle of claim 8, wherein said second force receiving surface is internally formed in the first sidewall of the support surface to provide the integrally formed spring.

* * * * *

UNITED STATES PATENT AND TRADEMARK OFFICE
CERTIFICATE OF CORRECTION

PATENT NO. : 5,519,777
DATED : May 21, 1996
INVENTOR(S) : Kurgan et al.

It is certified that error appears in the above-indentified patent and that said Letters Patent is hereby corrected as shown below:

On title page,
In item [75] Inventors, please replace "Jeffrey" with --Jeffery--.

In claim 7 at column 11, line 22, please insert --a-- after the word "upon".

In claim 9 at column 11, line 37, please replace "cause" with --causes--.

In claim 13 at column 12, line 17, please replace the phrase "first and second force" with --first or second force--.

Signed and Sealed this

Thirty-first Day of December, 1996

*Attest:*

BRUCE LEHMAN

*Attesting Officer*   *Commissioner of Patents and Trademarks*